March 31, 1925.

H. GEISENHÖNER 1,531,920

INDUCTION MOTOR WINDING

Filed Nov. 1, 1922

Inventor:
Henry Geisenhöner,
by *Alexander D. [signature]*
His Attorney.

Patented Mar. 31, 1925.

1,531,920

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

INDUCTION-MOTOR WINDING.

Application filed November 1, 1922. Serial No. 598,410.

*To all whom it may concern:*

Be it known that I, HENRY GEISENHÖNER, a citizen of the United States, residing at Schenectady, in the county of Schenectady, State of New York, have invented certain new and useful Improvements in Induction-Motor Windings, of which the following is a specification.

My invention relates to windings for dynamo electric machines and more specifically to windings of the squirrel cage type employed on the secondary members of induction motors, and has for its object to provide a winding of the character specified which will be cheap and simple to manufacture and assemble and which will be rugged and efficient in construction and operation.

Figure 3:
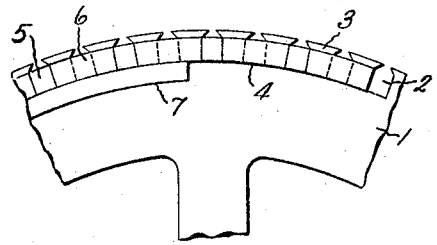
Figure 1:
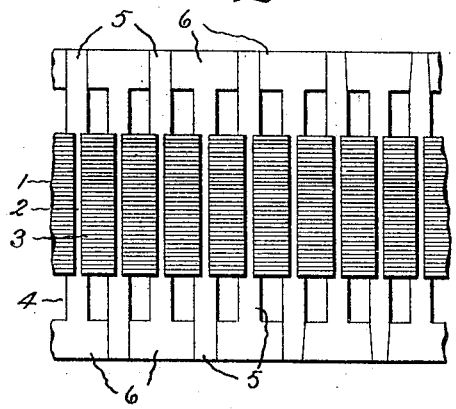
Figure 2:
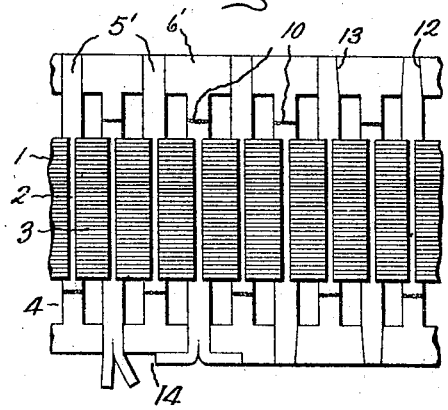
Figure 4:
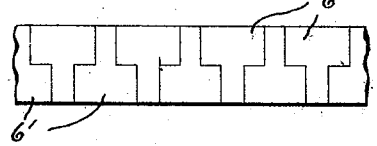
Figure 5:
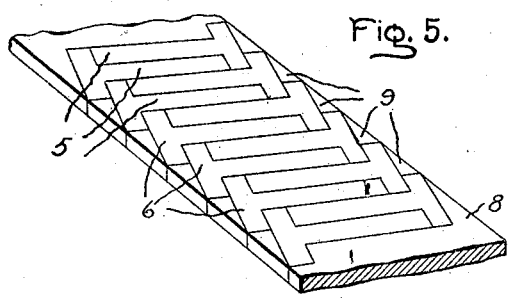

The features of my invention, which I believe to be novel and patentable, will be pointed out in the claims appended hereto. The manner of manufacturing and assembling my improved winding will now be explained in connection with the accompanying drawings, in which Figs. 1 and 2 show partial plan views of induction motor rotors, illustrative of the manner in which my improved winding is assembled in place; Fig. 3 shows an end view of a rotor provided with a winding built in accordance with my invention, and Figs. 4 and 5 show the manner in which my improved winding parts may be stamped from sheet metal with little or no waste of material.

Referring to the drawings, and more particularly to Figs. 1, 2 and 3, 1 indicates the laminated iron core of an induction motor secondary. The core is provided with slots 2 of rectangular shape. As here shown the slots are partially closed by the enlarged section of the teeth 3 at the periphery. 4 indicates the squirrel cage winding. In Fig. 1 this winding is made up of bars having a long, narrow portion 5 and enlarged rectangular T-shaped head 6. The heads 6 of alternate bars are reversed and are of such width that they completely fill the space between the adjacent bar portions 5 at the ends of the rotor thereby forming with the intervening bars 5 a complete end ring. In assembling this squirrel cage winding a T-headed bar is inserted in every other slot from one end of the rotor and other bars are inserted in the remaining slots from the other end of the rotor, the head 6 being used as a handle in each case and the narrow portions 5 being shoved through the slots. The bar portions 5 will, of course, be proportioned to fit snugly in the slots. After being thus assembled, the surfaces between the heads 6 and adjacent contacting surfaces of the bars 5 are brazed, welded, or otherwise united together. Preferably, although not necessarily, additional end ring 7 may be united to each bar beneath the end rings already formed at the two ends of the rotor. If desirable the additional end ring may be inserted in grooves turned in the ends of the assembled winding. The economy of material used is a maximum if the width of the bar portions 5 is made one-third the width of the head 6, and for ordinary purposes these proportions are desirable, as it makes the width of the teeth 3 equal to the width of the bars 5. Referring to Fig. 5 it will be seen that, if these proportions are adhered to, the T-headed members may be stamped from a sheet 8 of copper or other suitable material leaving only a narrow saw-tooth scrap strip 9 at either edge of the sheet. Where a secondary member is provided with an unequal number of slots and bars, the last bar assembled can be made to fit in place by cutting off one side of its head and inserting the block thus cut off between the two adjacent unheaded bars at the opposite end of the winding.

In Fig. 2 I have shown my improved winding made up of parts where the T-head sections 6' are made separate from the bar portions 5' and united by brazing or welding as indicated at 10. The head 6' may then be stamped from a sheet of the proper width without any waste of material in the manner designated in Fig. 4. Likewise, the straight bar portions 5' may also be stamped from a sheet without waste or cut from bars of the proper dimensions.

In some instances it may be desirable to taper the small ends of the T-headed bars and provide a corresponding taper on the edges of the T-shaped heads as indicated at 12; or only one edge of the contacting surfaces may be tapered, as indicated at 13, to the end that the parts may be driven together to a wedged fit and the parts thereafter united. Also I may split the free ends of the bars 5 or 5', let them extend slightly beyond the T heads and turn them over the heads so that two adjoining split ends on alternate bars 5' will meet at the center of the intervening head in a manner indicated at 14. In this case the depth of the head portions may be decreased, as indicated.

The union of the parts of a squirrel cage built in accordance with my invention may be accomplished to advantage by existing electrowelding processes. The parts are economical to manufacture and assemble, and the united winding is of good mechanical strength and high conductivity and well adapted in every way for the purpose to which it is to be applied. Obvious variations in form, dimensions, and relative arrangement of the parts are intended to be included within the scope of my invention.

What I claim as new and desire to secure by Letters Patent of the United States, is:—

1. A squirrel cage winding for induction motors comprising T-headed bars united together with every other bar reversed and with the ends of the T sections abutting against the sides of adjacent bar sections.

2. An induction motor secondary comprising a slotted core and T-headed bars assembled in said slots with alternate bars reversed and with the small ends of said bars extending between and united with adjacent head sections on both ends of said core.

3. In a squirrel cage induction motor secondary, an end ring therefor comprising T-shaped heads on every other bar of said squirrel cage and the adjacent ends of the other intermediate bars at one end of the secondary, the T-shaped heads being extended to and united with the adjacent ends of the intermediate bars.

4. A squirrel cage secondary for induction machines comprising in combination a slotted core member, the teeth and slots of which are of substantially equal width, and a plurality of T-headed bars assembled in said slots with every other bar reversed, the dimensions of the T portion of each bar being such as to fill the intervening space between the small ends of alternate bars for the purpose of forming end rings.

5. An induction motor secondary comprising a slotted core member and T-headed bars assembled in said slots with alternate bars reversed and with the small ends of said bars extending between and united to adjacent head sections, the contacting surfaces of said bars being beveled in such a manner that they may be driven together to a wedged fit.

6. An induction motor secondary of the squirrel cage type made up of a slotted core and bars each provided with a head on one end thereof, said heads being so dimensioned that when assembled in the slots with alternate bars reversed the head portions contact with the intervening bars, whereby, when so assembled, end rings may be formed by uniting said contacting surfaces together.

7. A secondary member for induction machines comprising a core provided with rectangular slots and a squirrel cage winding therefor made up of rectangular-shaped bars provided with substantially rectangular T-shaped heads.

In witness whereof, I have hereunto set my hand this 31st day of October, 1922.

HENRY GEISENHÖNER.